(12) United States Patent
Liu et al.

(10) Patent No.: US 12,007,223 B2
(45) Date of Patent: Jun. 11, 2024

(54) HIGH-ACCURACY THREE-DIMENSIONAL RECONSTRUCTION METHOD AND SYSTEM, COMPUTER DEVICE, AND STORAGE MEDIUM

(71) Applicant: SHENZHEN UNIVERSITY, Guangdong (CN)

(72) Inventors: Xiaoli Liu, Guangdong (CN); Yupei Miao, Guangdong (CN); Yang Yang, Guangdong (CN); Qijian Tang, Guangdong (CN); Xiang Peng, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 259 days.

(21) Appl. No.: 17/485,404

(22) Filed: Sep. 25, 2021

(65) Prior Publication Data

US 2022/0307823 A1   Sep. 29, 2022

(30) Foreign Application Priority Data

Mar. 18, 2021   (CN) .......................... 202110292282.7

(51) Int. Cl.
*G06T 7/80*   (2017.01)
*G01B 11/03*   (2006.01)
*G01B 11/25*   (2006.01)

(52) U.S. Cl.
CPC .......... *G01B 11/2504* (2013.01); *G01B 11/03* (2013.01); *G01B 11/2513* (2013.01); *G06T 7/80* (2017.01)

(58) Field of Classification Search
CPC . G01B 11/2504; G01B 11/03; G01B 11/2513; G06T 7/80; G06T 7/521; G06T 7/75; G06T 17/00; G06T 2207/30244
USPC ........................................................ 382/154
See application file for complete search history.

(56) References Cited

U.S. PATENT DOCUMENTS

2020/0371378 A1 * 11/2020 Makinen ................ G02B 30/50

* cited by examiner

*Primary Examiner* — Stephen P Coleman
(74) *Attorney, Agent, or Firm* — Li & Cai Intellectual Property (USA) Office (57) ABSTRACT

A high-accuracy three-dimensional reconstruction method and system, a computer device, and a storage medium are provided. The method includes: performing calibration on an imaging apparatus; calculating each unidirectional absolute phase distribution diagram of a planar target; establishing an imaging apparatus coordinate system, and fitting corresponding epipolar lines in a normalization plane; calculating intersections between the corresponding planar target and rays formed by points on an epipolar line and an optical center of the imaging apparatus, fitting a projection beam, and establishing a projection mapping coefficient table; and projecting a pattern to an object under test, acquiring an object image of the object under test by using the imaging apparatus, calculating and searching for projection mapping coefficients corresponding to absolute phases in the object image, and calculating corresponding spatial three-dimensional point coordinates by using the projection mapping coefficients.

8 Claims, 3 Drawing Sheets

HIGH-ACCURACY THREE-DIMENSIONAL RECONSTRUCTION METHOD AND SYSTEM, COMPUTER DEVICE, AND STORAGE MEDIUM

FIELD OF THE DISCLOSURE

The present disclosure relates to the field of three-dimensional imaging technologies, and in particular, to a high-accuracy three-dimensional reconstruction method and system, a computer device, and a storage medium.

BACKGROUND OF THE DISCLOSURE

A monocular structured light three-dimensional imaging system is a noncontact optical three-dimensional digital imaging system with full-field measurement. In a monocular structured light measurement system, a projection apparatus is used to project a group of sinusoidal gratings or quasi-sinusoidal gratings to an object surface, a stripe pattern after shape modulation of the object surface is acquired by using an imaging apparatus, a spatial phase value of each measurement point is calculated in combination with a phase-shift technique, then corresponding points are found in image surfaces of the imaging apparatus and the projection apparatus by using phase information, and three-dimensional information of the object surface is calculated according to a triangulation method. The monocular structured light imaging system has been widely applied for its high imaging density, high imaging speed, high measurement accuracy, and high measurement universality. It is a critical step of three-dimensional imaging and measurement technologies to calibrate the imaging apparatus and the projection apparatus of the system. A method for calibrating an imaging apparatus is relatively mature and has relatively high accuracy. Some calibration methods are provided for the calibration of a projection apparatus in the prior art. Typical methods are as follows: 1. a projection calibration method based on a virtual mark point; and 2. a projection calibration method based on a phase-shift technique. In the first method, a relationship between the z=0 plane of a world coordinate system and an "imaging plane" of the projection apparatus is calculated by calculating a projection calibration pattern projected by a projection apparatus. In the second method, the projection apparatus projects a calibration pattern to establish a relationship between the z=0 plane of a world coordinate system and an "imaging plane" of the projection apparatus.

In both the projection calibration methods provided in the prior art, a projection apparatus is considered as an inverse imaging apparatus, and a conventionally used projection apparatus is digital light processing (DLP) or a liquid crystal display (LCD). As a result, a conventional three-dimensional measurement system is relatively huge, has an incompact structure, and is inconvenient in many application scenarios. With the development of microelectromechanical system (MEMS) technologies, the MEMS technologies have been widely applied to the field of three-dimensional measurement for various advantages such as a compact system structure, a small volume, and a low cost. However, at present, during the calibration of a projection apparatus of a MEMS in a three-dimensional measurement system based on the projection apparatus, because a conventional calibration algorithm is still used for calibration, the accuracy of three-dimensional reconstruction is reduced, and the accuracy of three-dimensional reconstruction is severely affected.

SUMMARY OF THE DISCLOSURE

Embodiments of the present disclosure provide a high-accuracy three-dimensional reconstruction method and system, a computer device, and a storage medium, to resolve the problem in the prior art that three-dimensional reconstruction of a three-dimensional measurement system based on a projection apparatus of a MEMS is inaccurate.

According to a first aspect, an embodiment of the present disclosure provides a high-accuracy three-dimensional reconstruction method based on projection beam calibration, including the following steps:

performing calibration on an imaging apparatus;

projecting patterns to a planar target at different positions by using a projection apparatus, acquiring each target image of the planar target by using the imaging apparatus, and calculating each unidirectional absolute phase distribution diagram of the planar target;

establishing the imaging apparatus coordinate system with the optical center of the imaging apparatus as a point of origin, using an absolute phase of the planar target at a designated position as a standard phase, searching each unidirectional absolute phase distribution diagram for first subpixels having a phase which is the same as the standard phase, converting the first subpixels into points in a normalization plane, and fitting corresponding epipolar lines in the normalization plane;

calculating intersections between the corresponding planar target and rays formed by all points on each epipolar line in the normalization plane and the optical center of the imaging apparatus, and fitting a corresponding projection beam by using the intersections;

establishing a projection mapping coefficient table according to position relationships between the projection beam and the points in the normalization plane; and projecting a pattern to an object under test by using the projection apparatus, acquiring an object image of the object under measurement by using the imaging apparatus, calculating a unidirectional absolute phase distribution diagram of the object image, searching the unidirectional absolute phase distribution diagram of the object image along a direction of the epipolar lines for sub-pixels with the same phase of the standard phase, searching the projection mapping coefficient table for projection mapping coefficients corresponding to the standard phase, and calculating corresponding spatial three-dimensional point coordinates by using the projection mapping coefficients.

According to a second aspect, an embodiment of the present disclosure provides a high-accuracy three-dimensional reconstruction system based on projection beam calibration, including:

an imaging apparatus calibration unit, configured to perform calibration on an imaging apparatus;

a unidirectional absolute phase distribution diagram acquisition unit, configured to: project patterns to a planar target at different positions by using a projection apparatus, acquire each target image of the planar target by using the imaging apparatus, and calculate each unidirectional absolute phase distribution diagram of the planar target;

an epipolar line fitting unit, configured to: establish the imaging apparatus coordinate system with the optical center of the imaging apparatus as the point of origin, use an absolute phase of the planar target at a designated position as a standard phase, search each unidirectional absolute phase distribution diagram for first subpixels having a phase which is the same as the standard phase, convert the first subpixels into points in a normalization plane, and fit corresponding epipolar lines in the normalization plane;

a projection beam fitting unit, configured to: calculate intersections between the corresponding planar target and rays formed by all points on each epipolar line in the normalization plane and the optical center of the imaging apparatus, and fit a corresponding projection beam by using the intersections;

a projection mapping coefficient lookup table setup unit, configured to establish a projection mapping coefficient table according to position relationships between the projection beam and the points in the normalization plane; and a spatial three-dimensional point coordinate acquisition unit, configured to: project a pattern to an object under test by using the projection apparatus, acquire an object image of the object under measurement by using the imaging apparatus, calculate a unidirectional absolute phase distribution diagram of the object image, search the projection mapping coefficient table for projection mapping coefficients corresponding to absolute phases in the unidirectional absolute phase distribution diagram of the object image, and calculate corresponding spatial three-dimensional point coordinates by using the projection mapping coefficients.

According to a third aspect, an embodiment of the present disclosure further provides a computer device, including a memory, a processor, and a computer program that is stored in the memory and is executable by the processor, where the processor executes the computer program to implement the high-accuracy three-dimensional reconstruction method based on projection beam calibration in the foregoing first aspect.

According to a fourth aspect, an embodiment of the present disclosure further provides a computer-readable storage medium, storing therein a computer program, where the computer program, when being executed by a processor, causes the processor to perform the high-accuracy three-dimensional reconstruction method based on projection beam calibration in the foregoing first aspect.

Embodiments of the present disclosure provide a high-accuracy three-dimensional reconstruction method and system, a computer device, and a storage medium. The method includes: performing calibration on an imaging apparatus; projecting patterns to a planar target at different positions by using a projection apparatus, acquiring each target image of the planar target by using the imaging apparatus, and calculating each unidirectional absolute phase distribution diagram of the planar target; establishing the imaging apparatus coordinate system with the optical center of the imaging apparatus as the point of origin, using an absolute phase of the planar target at a designated position as a standard phase, searching each unidirectional absolute phase distribution diagram for first subpixels having a phase which is the same as the standard phase, converting the first subpixels into points in a normalization plane, and fitting corresponding epipolar lines in the normalization plane; calculating intersections between the corresponding planar target and rays formed by all points on each epipolar line in the normalization plane and the optical center of the imaging apparatus, and fitting a corresponding projection beam by using the intersections; establishing a projection mapping coefficient table according to position relationships between the projection beam and the points in the normalization plane; and projecting a pattern to an object under test by using the projection apparatus, acquiring an object image of the object under measurement by using the imaging apparatus, calculating a unidirectional absolute phase distribution diagram of the object image, searching the unidirectional absolute phase distribution diagram of the object image along a direction of the epipolar lines for sub-pixels with the same phase of the standard phase, searching the projection mapping coefficient table for projection mapping coefficients corresponding to the standard phase, and calculating corresponding spatial three-dimensional point coordinates by using the projection mapping coefficients. In the embodiments of the present disclosure, a projection mapping coefficient table is established in advance, then projection mapping coefficients corresponding to absolute phases in an object image of an object under test are acquired, and spatial three-dimensional point coordinates of the object under measurement are calculated according to the projection mapping coefficients, so that the entire calculation process is stricter and more precise, and in addition, after the projection mapping coefficients are established, the acquisition of the spatial three-dimensional point coordinates of the object under measurement is faster and accurate.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show some embodiments of the present disclosure, and persons of ordinary skill in the art may still derive other drawings from these accompanying drawings without creative efforts.

DETAILED DESCRIPTION OF THE EXEMPLARY EMBODIMENTS

The following clearly and completely describes the technical solutions in the embodiments of the present disclosure with reference to the accompanying drawings in the embodiments of the present disclosure. Apparently, the described embodiments are some embodiments of the present disclosure rather than all the embodiments. All other embodiments obtained by persons of ordinary skill in the art based on the embodiments of the present disclosure without creative efforts fall within the protection scope of the present disclosure.

It should be understood that during use in this specification and the appended claims, the terms "include" and "comprise" specify the presence of described features, integers, steps, operations, elements and/or components, but do not preclude the presence or addition of one or more other features, integers, steps, operations, elements, components and/or sets thereof.

It should be further understood that the terminology used in the description of the present disclosure herein is for the purpose of describing particular embodiments only and is not intended to limit the present disclosure. As used in the description of the present disclosure and the appended claims, the singular forms "a," "an," and "the" are intended to include the plural forms as well, unless the context clearly indicates otherwise.

It should be further understood that the term "and/or" as used in the description of the present disclosure and the appended claims refers to and encompasses any and all possible combinations of one or more of the associated listed items.

Figure 1:
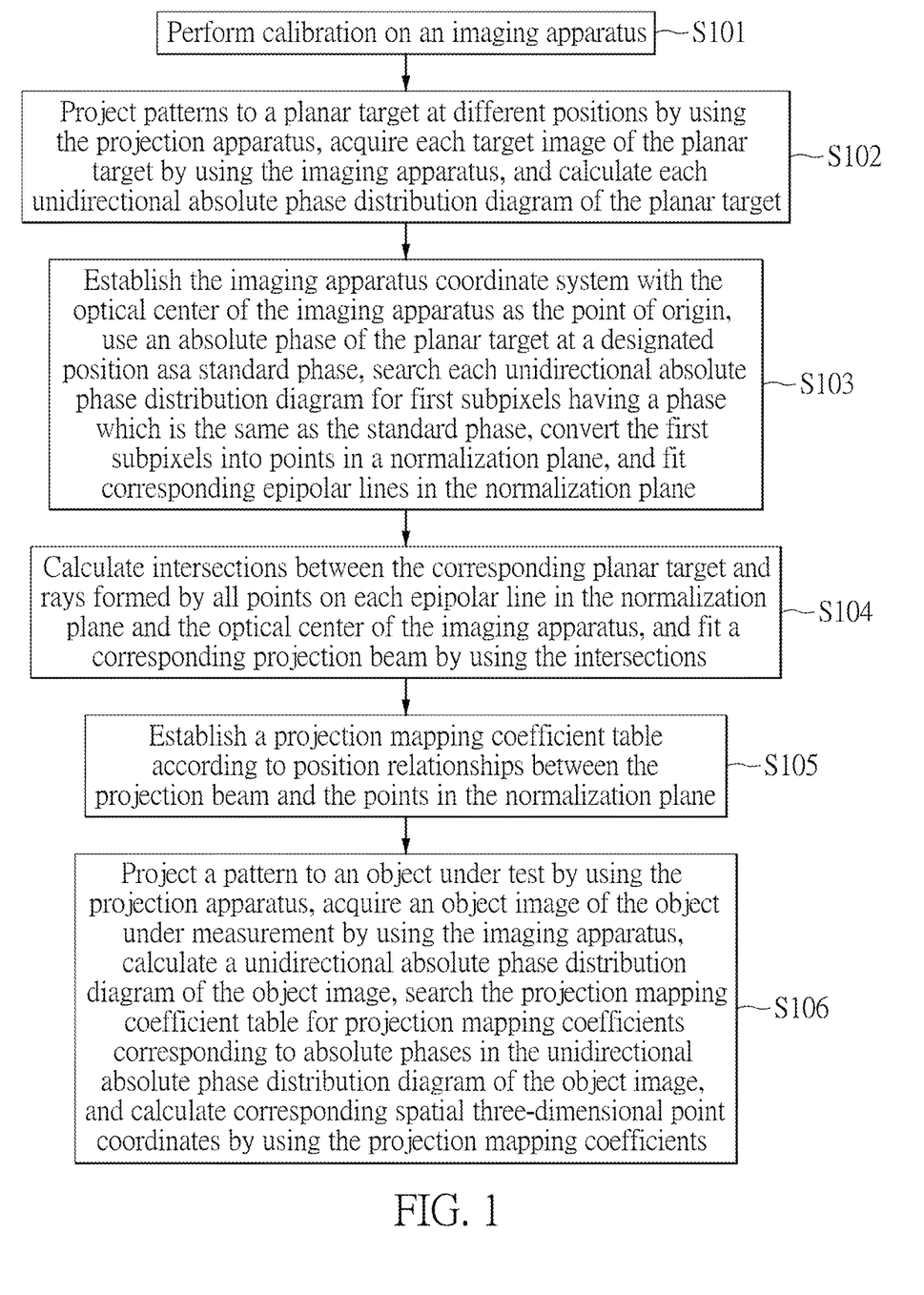
FIG. 1 is a schematic flowchart of a high-accuracy three-dimensional reconstruction method based on projection beam calibration according to an embodiment of the present disclosure.
Figure 2:
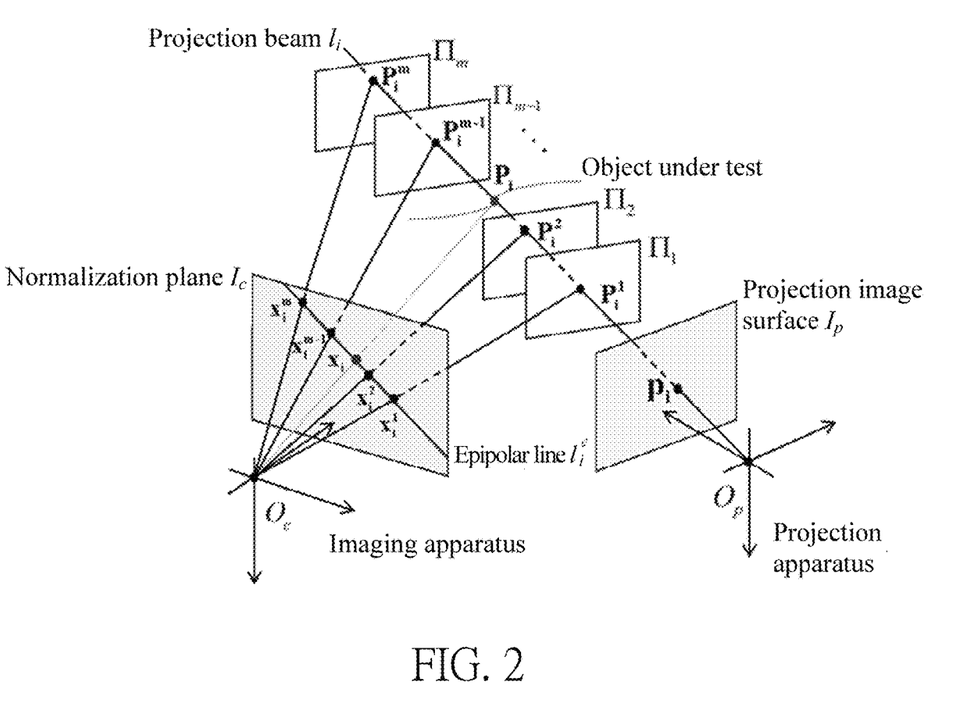
FIG. 2 is a simulated diagram of a high-accuracy three-dimensional reconstruction method based on projection beam calibration according to an embodiment of the present disclosure.

Referring to FIG. 1 and FIG. 2, FIG. 1 is a schematic flowchart of a high-accuracy three-dimensional reconstruction method based on projection beam calibration according to an embodiment of the present disclosure. The method includes steps S101 to S106.

S101: Perform calibration on an imaging apparatus.

In this step, during three-dimensional reconstruction, a position of the imaging apparatus first needs to be calibrated in space, so that the imaging apparatus with the calibrated position is used to acquire an image.

In an embodiment, step S101 includes:
acquiring target images of a planar target at different positions by using the imaging apparatus, and calibrating the parameters of the imaging apparatus by using a calibration algorithm.

In this embodiment, the target images of the planar target at the different positions are first acquired by using the imaging apparatus, and a position of the imaging apparatus is calculated according to the target images by using the Zhang Zhengyou calibration algorithm. During the acquisition of a target image, the planar target is first placed at a position in space. After the imaging apparatus is used to acquire a target image, the planar target is moved to another position to continue to acquire a target image. The planar target is moved a plurality of times to obtain a plurality of groups of target images. An overall procedure of the Zhang Zhengyou calibration algorithm is as follows: First, a plurality of target images of the planar target at different positions are photographed by using the imaging apparatus, then the target images are detected to acquire feature points of the target images, then intrinsic parameters and extrinsic parameters of the imaging apparatus in an optimal distortion-free case are calculated, maximum likelihood estimation is used to improve accuracy, and the least square is applied to calculate an actual radial distortion coefficient of the imaging apparatus. The estimation is optimized according to the intrinsic parameters, the extrinsic parameters, and the radial distortion coefficient of the imaging apparatus and by using a maximum likelihood method, thereby improving the accuracy of estimation.

S102: Project patterns to a planar target at different positions by using a projection apparatus, acquire each target image of the planar target by using the imaging apparatus, and calculate each unidirectional absolute phase distribution diagram of the planar target.

In this step, after the calibration of the imaging apparatus is completed, a pattern is projected to the planar target by using the projection apparatus. The imaging apparatus acquires a target image with the pattern of the planar target. Subsequently, the position of the planar target is changed to continue to project the pattern and acquire a target image. After the position of the planar target has been changed a plurality of times, a plurality of groups of target images are obtained, and then a unidirectional absolute phase distribution diagram of each target image is calculated by using the obtained target images. Specifically, phase decoding may be performed by using a Gray code in combination with a phase-shift method, to calculate the unidirectional absolute phase distribution diagram of each target image. With the combination of the Gray code and the phase-shift method, a quantity of digits of encoding of the Gray code can be reduced, the decoding speed is increased, and the disadvantage that it is difficult to reconstruct nonconsecutive positions in a single phase-shift method and a single Gray code method can be remedied. A specific encoding method that combines the Gray code and the phase-shift method is as follows: First, a series of Gray code black-and-white stripe patterns are projected to an object under test, where regions with the same code are used as one encoding period, and then a four-step phase-shift method is used to sequentially project four phase-shift patterns to further consecutively divide each encoding region. The projection apparatus may be a projection apparatus with a MEMS polarizer or may be a projection apparatus with a digital micromirror device (DMD) module. The MEMS polarizer is a micro drivable reflector manufactured based on MEMS technologies and has advantages such as a light weight, a small volume, easy mass production, and a relatively low production cost. For the operation principle of DMD, a micromirror apparatus reflects required light, and at the same time a light absorber absorbs unrequired light to implement the projection of an image. The irradiation direction of light is implemented by means of the action of static electricity and by controlling the angle of a micromirror.

S103: Establish the imaging apparatus coordinate system with the optical center of the imaging apparatus as the point of origin, use an absolute phase of the planar target at a designated position as a standard phase, search each unidirectional absolute phase distribution diagram for first subpixels having a phase which is the same as the standard phase, convert the first subpixels into points in a normalization plane, and fit corresponding epipolar lines in the normalization plane.

In this step, after the imaging apparatus coordinate system is established, an absolute phase of a planar target farthest away from the imaging apparatus is used as a standard phase, and each unidirectional absolute phase distribution diagram of the planar target is searched for first subpixels having a phase which is the same as the standard phase. The first subpixels are converted into points in the normalization plane after distortion removal, and an epipolar line is fitted. As shown in FIG. 2, if a projection image surface is the planar target farthest away from the imaging apparatus, so that at a point $p_i$ on the projection image surface, an absolute phase of the point is $\varphi_i$. Subpixels $x_i^1, x_i^2, \ldots, x_i^m$ having a phase which is the same as that of the point $p_i$ are found in each phase distribution of the planar target, and an epipolar line $l_i^e$ corresponding to the phase $\varphi_i$ is fitted by using $x_i^1, x_i^2, \ldots, x_i^m$, that is: $\varphi_i \rightarrow l_i^e$.

In an embodiment, the establishing the imaging apparatus coordinate system with the optical center of the imaging apparatus as the point of origin includes:
establishing the imaging apparatus coordinate system with the optical center of the imaging apparatus as the point of origin and an optical axis of the imaging apparatus as Z axis; and calculating each plane parameter equation of the planar target in the imaging apparatus coordinate system.

In this embodiment, as shown in FIG. 2, the imaging apparatus coordinate system with the optical center of the imaging apparatus as the point of origin and the optical axis as the Z axis is established. A general form of a plane parameter equation is A·X+B·Y+C·Z+D=0, where A, B, C, and D are coefficients of a plane formula.

In a specific embodiment, the calculating each plane parameter equation of the planar target in the imaging apparatus coordinate system includes:

acquiring each coordinate expression of the planar target in the imaging apparatus coordinate system by using a formula $\Pi_c = H^{-T} \cdot \Pi_w$, where $\Pi_w = (0,0,1,0)^T$ is an expression of the planar target in a world coordinate system, T represents a transpose of a matrix, and H is rigid transformation from the world coordinate system into the imaging apparatus coordinate system.

In this embodiment, the planar target in the world coordinate system may be represented as $\Pi_w = (0,0,1,0)^T$, so that the planar target in the imaging apparatus coordinate system may be represented as: $\Pi_c = H^{-T} \cdot \Pi_w$, where H represents a rigid transformation from the world coordinate system into the imaging apparatus coordinate system, and $H^{-T}$ represents an inverse matrix of a transpose matrix of a matrix H. A rotation matrix used in this embodiment is a rotation matrix $$R = \begin{bmatrix} r_{11} & r_{12} & r_{13} \\ r_{21} & r_{22} & r_{23} \\ r_{31} & r_{32} & r_{33} \end{bmatrix}$$

with three degrees of freedom, a translation vector is $T = [t_x\ t_y\ t_z]^T$, and $\Pi_w = (0,0,1,0)^T$ is substituted into the formula $\Pi_c = H^{-T} \cdot \Pi_w$:

$$\Pi_c = H^{-T} \cdot \Pi_w = \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix}^{-T} \begin{bmatrix} 0 \\ 0 \\ 1 \\ 0 \end{bmatrix} = \begin{bmatrix} r_{13} \\ r_{23} \\ r_{33} \\ -(t_x r_{13} + t_y r_{23} + t_z r_{33}) \end{bmatrix}$$

S104: Calculate intersections between the corresponding planar target and rays formed by all points on each epipolar line in the normalization plane and the optical center of the imaging apparatus, and fit a corresponding projection beam by using the intersections.

In this step, all the points on each epipolar line in the normalization plane and the optical center of the imaging apparatus are joined to form corresponding rays, the intersection between each ray and the corresponding planar target is acquired, and then the projection beam corresponding to each epipolar line is fitted according to the intersections.

In an embodiment, the calculating intersections between the corresponding planar target and rays formed by all points on each epipolar line in the normalization plane and the optical center of the imaging apparatus, and fitting a corresponding projection beam by using the intersections includes:

acquiring the rays formed by all the points on each epipolar line in the normalization plane and the optical center of the imaging apparatus, and acquiring an intersection between each ray and the corresponding planar target for as each spatial point of the planar target; and sequentially connecting the spatial points of the planar target, to obtain the corresponding projection beam.

In this embodiment, each spatial point on the planar target is first acquired, and then the spatial points are sequentially connected to fit the corresponding projection beam. As shown in FIG. 2, all points $x_i^1, x_i^2, \ldots, x_i^m$ on an epipolar line in the normalization plane and an optical center $O_c$ of a camera form corresponding rays $O_c x_i^1, O_c x_i^2, \ldots, O_c x_i^m$, and each ray and a corresponding plane parameter equation $\Pi_c$ are joined, so that spatial points $P_i^1, P_i^2, \ldots, P_i^m$ on the corresponding planar target can be acquired, and next the spatial points $P_i^1, P_i^2, \ldots, P_i^m$ are used to fit a corresponding projection beam $l_i$. Therefore, each phase $\varphi_i$ on the projection image surface corresponds to one the projection beam $l_i$, that is: $\varphi_i \rightarrow l_i$.

S105: Establish a projection mapping coefficient table according to position relationships between the projection beam and the points in the normalization plane.

In this step, a point corresponding to each projection beam in the normalization plane is acquired, and the projection mapping coefficient table is established according to the position relationship between each projection beam and the corresponding point in the normalization plane.

S106: Project a pattern to an object under test by using the projection apparatus, acquire an object image of the object under measurement by using the imaging apparatus, calculate a unidirectional absolute phase distribution diagram of the object image, search the projection mapping coefficient table for projection mapping coefficients corresponding to absolute phases in the unidirectional absolute phase distribution diagram of the object image, and calculate corresponding spatial three-dimensional point coordinates by using the projection mapping coefficients.

In this step, when the spatial three-dimensional point coordinates of the object under test are measured, the pattern is first projected to the object under measurement by using the projection apparatus. The imaging apparatus acquires an object image of the object under measurement, then calculates the corresponding unidirectional absolute phase distribution diagram, and searches the projection mapping coefficient table for the projection mapping coefficients corresponding to the absolute phases in the unidirectional absolute phase distribution diagram, thereby calculating the corresponding spatial three-dimensional point coordinates.

In an embodiment, the searching the projection mapping coefficient table for projection mapping coefficients corresponding to the standard phase, and calculating corresponding spatial three-dimensional point coordinates by using the projection mapping coefficients includes:

acquiring an absolute phase of each point in a projection image surface of the projection apparatus as an object phase, and searching a unidirectional absolute phase distribution diagram of the object under measurement for a second subpixel corresponding to the object phase; and searching the projection mapping coefficient table for the projection mapping coefficients corresponding to the object phase, and calculating the corresponding spatial three-dimensional point coordinates.

In this embodiment, an absolute phase of one point in the projection image surface is used as an object phase, and a second subpixel corresponding to the object phase is found. Corresponding spatial three-dimensional point coordinates are calculated in combination with the projection mapping coefficients corresponding to the object phase. Specifically, an absolute phase of a point in the projection image surface is denoted as an object phase $\varphi_i$, so that the object phase $\varphi_i$ can be found from the unidirectional absolute phase distribution diagram of the object under measurement, a coordinate of the corresponding second subpixel in a physical coordinate system is $x_i=(x_i, y_i)^T$, and a spatial three-dimensional point coordinate corresponding to the object phase $\varphi_i$ is $P_i=(X_i, Y_i, Z_i)^T$. In addition, a projection beam corresponding to the object phase $\varphi_i$ is $l_i$.

Therefore, the spatial three-dimensional point $P_i$ may be represented as $$\begin{cases} X_i = k_{i1}Z_i + b_{i1} \\ Y_i = k_{i3}Z_i + b_{i2} \end{cases}$$

on the projection beam $l_i$, where $k_{i1}$, $b_{i1}$, $k_{i2}$, and $b_{i2}$ are coefficients of the projection beam.

$$\begin{cases} \dfrac{x_i}{f} = \dfrac{X_i}{Z_i} \\ \dfrac{y_i}{f} = \dfrac{Y_i}{Z_i} \end{cases}$$

may be obtained from $$\frac{x}{f} = \frac{X}{Z}.$$

Further, because a focal length f of the normalization plane here is 1, $$\begin{cases} x_i = \dfrac{X_i}{Z_i} \\ y_i = \dfrac{Y_i}{Z_i} \end{cases}$$

may be obtained. It may be derived from the foregoing formula that:

$$\begin{cases} X_i = \dfrac{1}{\dfrac{1}{k_{i1}b_{i1}}x_i - \dfrac{1}{b_{i1}}} + b_{i1} = \dfrac{1}{A_ix_i + B_i} + C_i \\ Y_i = \dfrac{1}{\dfrac{1}{k_{i2}b_{i2}}y_i - \dfrac{1}{b_{i2}}} + b_{i2} = \dfrac{1}{D_iy_i + E_i}F_i \\ Z_i = \dfrac{X_i}{x_i} \end{cases}$$

Therefore, the spatial three-dimensional point coordinates are:

$$X_i = \frac{1}{A_ix_i + B_1} + C_i, \; Y_i = \frac{1}{D_iy_i + E_i} + F_i, \; Z_i = \frac{X_i}{x_i}.$$

$\{A_i, B_i, C_i; D_i, E_i, F_i\}$ are the projection mapping coefficients corresponding to the object phase.

As shown in FIG. 2, a coordinate system is established with the optical center of the imaging apparatus as the point of origin, and the planar target is separately placed at different positions in space, and target images of the planar target at the different positions are acquired. The placement of the planar target is controllable. Therefore, coordinates corresponding to a spatial three-dimensional point on the planar target may be acquired in advance, and then specific values corresponding to projection mapping coefficients $\{A_i, B_i, C_i; D_i, E_i, F_i\}$ can be acquired by substituting the acquired specific coordinates of the spatial three-dimensional point into a formula $$X_i = \frac{1}{A_ix_i + B_i} + C_i, \; Y_i = \frac{1}{D_iy_i + E_i} + F_i, \; Z_i = \frac{X_i}{x_i}.$$

Figure 3:
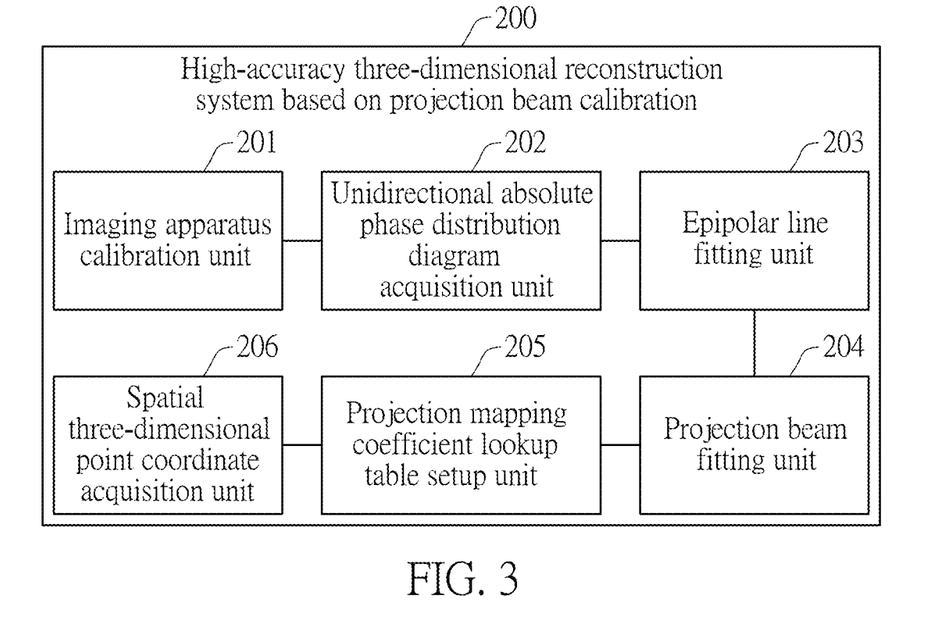
FIG. 3 is a schematic block diagram of a high-accuracy three-dimensional reconstruction system based on projection beam calibration according to an embodiment of the present disclosure.

Referring to FIG. 3, FIG. 3 is a schematic block diagram of a high-accuracy three-dimensional reconstruction system based on projection beam calibration according to an embodiment of the present disclosure. A high-accuracy three-dimensional reconstruction system 200 based on projection beam calibration includes:

an imaging apparatus calibration unit 201, configured to perform calibration on an imaging apparatus;

a unidirectional absolute phase distribution diagram acquisition unit 202, configured to: project patterns to a planar target at different positions by using a projection apparatus, acquire each target image of the planar target by using the imaging apparatus, and calculate each unidirectional absolute phase distribution diagram of the planar target;

an epipolar line fitting unit 203, configured to: establish the imaging apparatus coordinate system with an optical center of the imaging apparatus as a point of origin, use an absolute phase of the planar target at a designated position as a standard phase, search each unidirectional absolute phase distribution diagram for first subpixels having a phase which is the same as the standard phase, convert the first subpixels into points in a normalization plane, and fit corresponding epipolar lines in the normalization plane;

a projection beam fitting unit 204, configured to: calculate intersections between the corresponding planar target and rays formed by all points on each epipolar line in the normalization plane and the optical center of the imaging apparatus, and fit a corresponding projection beam by using the intersections;

a projection mapping coefficient lookup table setup unit 205, configured to establish a projection mapping coefficient table according to position relationships between the projection beam and the points in the normalization plane; and a spatial three-dimensional point coordinate acquisition unit 206, configured to: project a pattern to an object under test by using the projection apparatus, acquire an object image of the object under measurement by using the imaging apparatus, calculate a unidirectional absolute phase distribution diagram of the object image, search the projection mapping coefficient table for projection mapping coefficients corresponding to absolute phases in the unidirectional absolute phase distribution diagram of the object image, and calculate corresponding spatial three-dimensional point coordinates by using the projection mapping coefficients.

In an embodiment, the epipolar line fitting unit 203 includes:

an imaging apparatus coordinate system establishment unit, configured to establish the imaging apparatus coordinate system with the optical center of the imaging apparatus as the point of origin and an optical axis of the imaging apparatus as Z axis; and a plane parameter equation calculation unit, configured to calculate each plane parameter equation of the planar target in the imaging apparatus coordinate system.

In an embodiment, the plane parameter equation calculation unit includes:
a planar target coordinate expression acquisition unit, configured to acquire each coordinate expression of the planar target in the imaging apparatus coordinate system by using a formula $\Pi_c = H^{-T} \cdot \Pi_w$, where $\Pi_w = (0,0,1,0)^T$ is an expression of the planar target in a world coordinate system, T represents a transpose of a matrix, and H is rigid transformation from the world coordinate system into the imaging apparatus coordinate system.

In an embodiment, the projection beam fitting unit 204 includes:
a spatial point acquisition unit, configured to: acquire the rays formed by all the points on each epipolar line in the normalization plane and the optical center of the imaging apparatus, and acquire an intersection between each ray and the corresponding planar target for as each spatial point of the planar target; and
a projection beam acquisition unit, configured to sequentially connect the spatial points of the planar target, to obtain the corresponding projection beam.

In an embodiment, the spatial three-dimensional point coordinate acquisition unit 206 includes:
a second subpixel acquisition unit, configured to: acquire an absolute phase of each point in a projection image surface of the projection apparatus as an object phase, and search a unidirectional absolute phase distribution diagram of the object under measurement for a second subpixel corresponding to the object phase; and
a spatial three-dimensional point coordinate calculation unit, configured to: search the projection mapping coefficient table for the projection mapping coefficients corresponding to the object phase, and calculate the corresponding spatial three-dimensional point coordinates.

In an embodiment, the spatial three-dimensional point coordinate calculation unit includes:
a formula calculation unit, configured to calculate the corresponding spatial three-dimensional point coordinates according to the following expression:

$$X_i = \frac{1}{A_i x_i + B_i} + C_i, \ Y_i = \frac{1}{D_i y_i + E_i} + F_i, \ Z_i = \frac{X_i}{x_i}$$

where $\{A_i, B_i, C_i; D_i, E_i, F_i\}$ are the projection mapping coefficients corresponding to the object phase.

In an embodiment, the imaging apparatus calibration unit 201 includes:
an imaging apparatus position calculation unit, configured to: acquire target images of the planar target at different positions by using the imaging apparatus, and calibrate a position of the imaging apparatus by using a calibration algorithm.

An embodiment of the present disclosure further provides a computer device, including a memory, a processor, and a computer program that is stored in the memory and is executable by the processor, the processor executes the computer program to implement the foregoing high-accuracy three-dimensional reconstruction method based on projection beam calibration.

An embodiment of the present disclosure further provides a computer-readable storage medium, storing therein a computer program, where the computer program, when being executed by a processor, causes the processor to implement the foregoing high-accuracy three-dimensional reconstruction method based on projection beam calibration.

All embodiments are described in the present disclosure by using the progressive method. Each embodiment describes only the difference from other embodiments. For the same or similar parts among all embodiments, reference may be made to the relevant parts. For the system disclosed in the embodiments, because the apparatus corresponds to the method disclosed in the embodiments, the description is relatively simple. For related parts, reference may be made to the description of the method part. It should be noted that for a person of ordinary skill in the art, several improvements and modifications may further be made to the present disclosure without departing from the principle of the present disclosure. These improvements and modifications should also fall within the protection scope of the claims of the present disclosure.

It should be further noted that the relational terms in this specification such as first and second are used only to differentiate an entity or operation from another entity or operation, and do not require or imply any actual relationship or sequence between these entities or operations. Moreover, the terms "include", "comprise", or any variation thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . . " does not exclude other same elements existing in the process, the method, the object or the device which includes the element.

What is claimed is:

1. A high-accuracy three-dimensional reconstruction method based on projection beam calibration using a high-accuracy three-dimensional reconstruction system based on projection beam calibration, applied to a projection apparatus provided with a microelectromechanical system (MEMS) polarizer or a digital micromirror device (DMD) module, the high-accuracy three-dimensional reconstruction system based on projection beam calibration including an imaging apparatus calibration unit, a unidirectional absolute phase distribution diagram acquisition unit, an epipolar line fitting unit, a plane parameter equation calculation unit, a projection beam fitting unit, a projection mapping coefficient lookup table setup unit and a spatial three-dimensional point coordinate acquisition unit,
the high-accuracy three-dimensional reconstruction method based on projection beam calibration comprising the following steps:
the imaging apparatus calibration unit performing calibration on an imaging apparatus;
the unidirectional absolute phase distribution diagram acquisition unit projecting patterns to a planar target at different positions by using the projection apparatus, acquiring each target image of the planar target by using the imaging apparatus, and calculating each unidirectional absolute phase distribution diagram of the planar target;
the epipolar line fitting unit establishing the imaging apparatus coordinate system with the optical center of the imaging apparatus as the point of origin and an optical axis of the imaging apparatus as Z axis, calculating each plane parameter equation of the planar target in the imaging apparatus coordinate system, using an absolute phase of the planar target at a designated position as a standard phase, searching each unidirectional absolute phase distribution diagram for first subpixels having a phase which is the same as the standard phase, converting the first subpixels into points in a normalization plane, and fitting corresponding epipolar lines in the normalization plane;

wherein the epipolar line fitting unit includes the plane parameter equation calculation unit, and the plane parameter equation calculation unit is configured to calculate each plane parameter equation of the planar target in the imaging apparatus coordinate system, and acquire each coordinate expression of the planar target in the imaging apparatus coordinate system by using a formula $\Pi_c = H^{-T} \cdot \Pi_w$, wherein $\Pi_w = (0, 0, 1, 0)^T$ is an expression of the planar target in a world coordinate system, T represents a transpose of a matrix, and His rigid transformation from the world coordinate system into the imaging apparatus coordinate system, the projection beam fitting unit calculating intersections between the corresponding planar target and rays formed by all points on each epipolar line in the normalization plane and the optical center of the imaging apparatus, and fitting a corresponding projection beam by using the intersections;

wherein the calculating intersections between the corresponding planar target and rays formed by all points on each epipolar line in the normalization plane and the optical center of the imaging apparatus, and fitting a corresponding projection beam by using the intersections includes the following steps:

all points on the epipolar line in the normalization plane and the optical center of a camera form corresponding rays, and each ray and a corresponding plane parameter equation are joined, so that spatial points on the corresponding planar target can be acquired, and next the spatial points are used to fit a corresponding projection beam, the projection mapping coefficient lookup table setup unit establishing a projection mapping coefficient table according to position relationships between the projection beam and the points in the normalization plane; and spatial three-dimensional point coordinate acquisition unit projecting a pattern to an object under test by using the projection apparatus, acquiring an object image of the object under measurement by using the imaging apparatus, calculating a unidirectional absolute phase distribution diagram of the object image, searching the projection mapping coefficient table for projection mapping coefficients corresponding to absolute phases in the unidirectional absolute phase distribution diagram of the object image, and calculating corresponding spatial three-dimensional point coordinates by using the projection mapping coefficients.

2. The high-accuracy three-dimensional reconstruction method based on projection beam calibration according to claim 1, wherein the calculating intersections between the corresponding planar target and rays formed by all points on each epipolar line in the normalization plane and the optical center of the imaging apparatus, and fitting a corresponding projection beam by using the intersections comprises:

acquiring the rays formed by all the points on each epipolar line in the normalization plane and the optical center of the imaging apparatus, and acquiring an intersection between each ray and the corresponding planar target for as each spatial point of the planar target; and sequentially connecting the spatial points of the planar target to obtain the corresponding projection beam.

3. The high-accuracy three-dimensional reconstruction method based on projection beam calibration according to claim 1, wherein the performing calibration on the imaging apparatus comprises:

acquiring target images of the planar target at different positions by using the imaging apparatus, and calibrating a position of the imaging apparatus by using a calibration algorithm.

4. A computer device, comprising a memory, a processor, and a computer program that is stored in the memory and is executable by the processor, wherein the processor executes the computer program to implement the high-accuracy three-dimensional reconstruction method based on projection beam calibration according to claim 1.

5. A non-transitory computer-readable storage medium, storing therein a computer program, wherein the computer program, when being executed by a processor, causes the processor to perform the high-accuracy three-dimensional reconstruction method based on projection beam calibration according to claim 1.

6. The high-accuracy three-dimensional reconstruction method based on projection beam calibration according to claim 1, wherein the searching the projection mapping coefficient table for projection mapping coefficients corresponding to absolute phases in the unidirectional absolute phase distribution diagram of the object image, and calculating corresponding spatial three-dimensional point coordinates by using the projection mapping coefficients comprises:

acquiring an absolute phase of each point in a projection image surface of the projection apparatus as an object phase, and searching a unidirectional absolute phase distribution diagram of the object under measurement for a second subpixel corresponding to the object phase; and searching the projection mapping coefficient table for the projection mapping coefficients corresponding to the object phase, and calculating the corresponding spatial three-dimensional point coordinates.

7. The high-accuracy three-dimensional reconstruction method based on projection beam calibration according to claim 5, wherein the calculating corresponding spatial three-dimensional point coordinates comprises:

calculating the corresponding spatial three-dimensional point coordinates according to the following expression:

$$X_i = \frac{1}{A_i x_i + B_i} + C_i, \; Y_i = \frac{1}{D_i y_i + E_i} + F_i, \; Z_i = \frac{X_i}{x_i}$$

wherein {Ai, Bi, Ci; Di, Ei, Fi} are the projection mapping coefficients corresponding to the object phase.

8. A high-accuracy three-dimensional reconstruction system based on projection beam calibration, comprising:

an imaging apparatus calibration unit configured to perform calibration on an imaging apparatus;

a unidirectional absolute phase distribution diagram acquisition unit configured to: project patterns to a planar target at different positions by using a projection apparatus, acquire each target image of the planar target by using the imaging apparatus, and calculate each unidirectional absolute phase distribution diagram of the planar target;

an epipolar line fitting unit configured to: establish the imaging apparatus coordinate system with the optical center of the imaging apparatus as the point of origin, use an absolute phase of the planar target at a designated position as a standard phase, search each unidirectional absolute phase distribution diagram for first subpixels having a phase which is the same as the standard phase, convert the first subpixels into points in a normalization plane, and fit corresponding epipolar lines in the normalization plane;

wherein the epipolar line fitting unit includes a plane parameter equation calculation unit, and the plane parameter equation calculation unit is configured to calculate each plane parameter equation of the planar target in the imaging apparatus coordinate system, acquiring each coordinate expression of the planar target in the imaging apparatus coordinate system by using a formula $\Pi_c = H^{-T} \cdot \Pi_w$, wherein $\Pi_w = (0, 0, 1, 0)^T$ is an expression of the planar target in a world coordinate system, T represents a transpose of a matrix, and H is rigid transformation from the world coordinate system into the imaging apparatus coordinate system, a projection beam fitting unit configured to: calculate intersections between the corresponding planar target and rays formed by all points on each epipolar line in the normalization plane and the optical center of the imaging apparatus, and fit a corresponding projection beam by using the intersections;

a projection mapping coefficient lookup table setup unit configured to establish a projection mapping coefficient table according to position relationships between the projection beam and the points in the normalization plane; and a spatial three-dimensional point coordinate acquisition unit configured to: project a pattern to an object under test by using the projection apparatus, acquire an object image of the object under measurement by using the imaging apparatus, calculate a unidirectional absolute phase distribution diagram of the object image, search the projection mapping coefficient table for projection mapping coefficients corresponding to absolute phases in the unidirectional absolute phase distribution diagram of the object image, and calculate corresponding spatial three-dimensional point coordinates by using the projection mapping coefficients.

* * * * *